March 6, 1962 P. E. SHIELDS 3,023,930
SEED PEANUT PLANTER WITH HOUSING AND SEED CHUTE
Filed Sept. 16, 1958 2 Sheets-Sheet 1

Peter E. Shields
INVENTOR.

March 6, 1962 P. E. SHIELDS 3,023,930
SEED PEANUT PLANTER WITH HOUSING AND SEED CHUTE
Filed Sept. 16, 1958 2 Sheets-Sheet 2
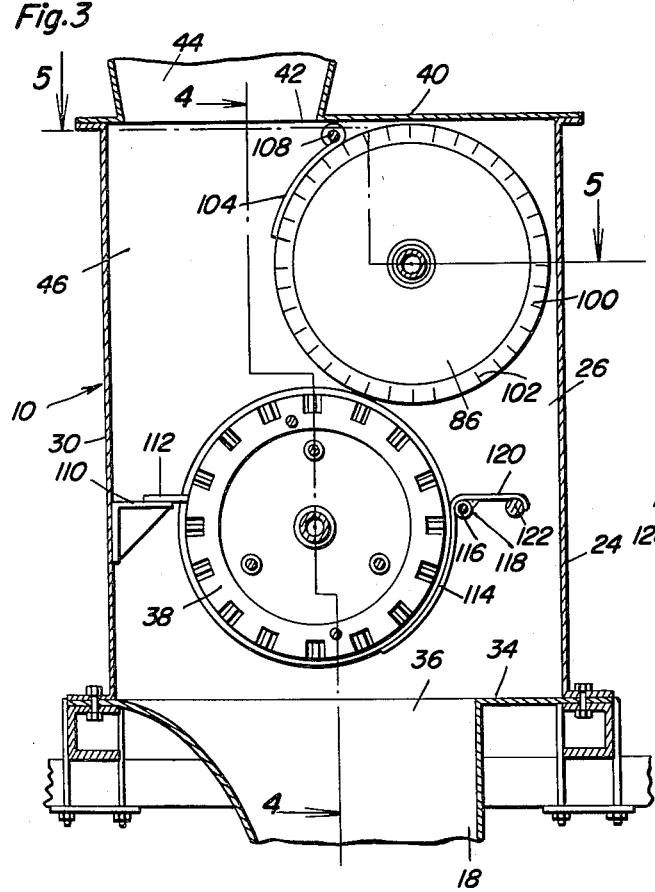
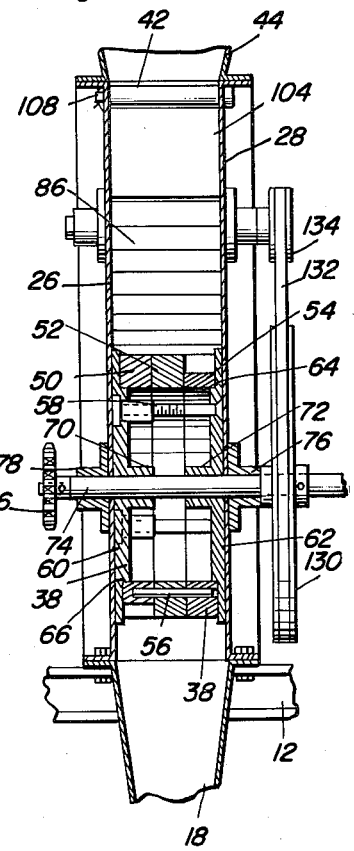
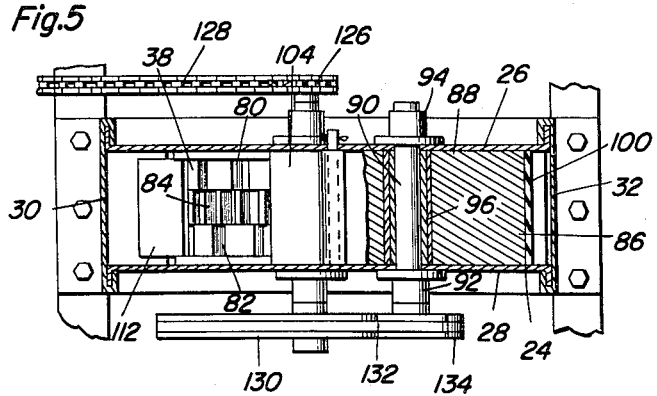
Peter E. Shields
INVENTOR.

United States Patent Office 3,023,930
Patented Mar. 6, 1962

3,023,930
SEED PEANUT PLANTER WITH HOUSING
AND SEED CHUTE
Peter E. Shields, 746 N. Main St., Scotland Neck, N.C.
Filed Sept. 16, 1958, Ser. No. 761,378
1 Claim. (Cl. 221—200)

This invention relates to a planter and more particularly to a high speed peanut planter.

An object of the invention is to provide an improved and new high speed planter capable of greatly increased operational speed, yet maintaining an economical construction.

Even though farming has been mechanized to a considerable extent, to the extent that is known there is no high speed planter for peanuts available at the present time. Commercially available planters for peanuts are the same as those that were used many years ago even though high speed tractors capable of much greater speed in the fields, are in common use. This invention, by virtue of its construction and operation enables peanuts to be planted at a speed compatible with other necessary equipment, for instance the speed of the tractor which draws the planter through the field.

A further object of the invention is to provide a practical mechanically simple high speed planter having a unique way of internally handling the peanuts as they are withdrawn from a supply, for instance a hopper, and deposited, one-by-one, in a field, for example through a seed chute.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged sectional view taken on the line 3—3 of FIGURE 1.

FIGURE 4 is a sectional view taken approximatly on the line 4—4 of FIGURE 3.

FIGURE 5 is a transverse sectional view taken approximately on the line 5—5 of FIGURE 3.

Figure 1:
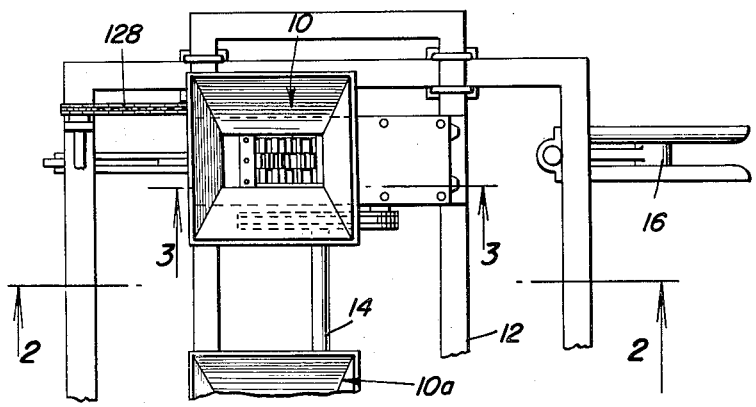
FIGURE 1 is a fragmentary top view of a gang planter showing that the invention is capable of being embodied as a single unit to be duplicated in any numbers on a single planter frame.
Figure 2:
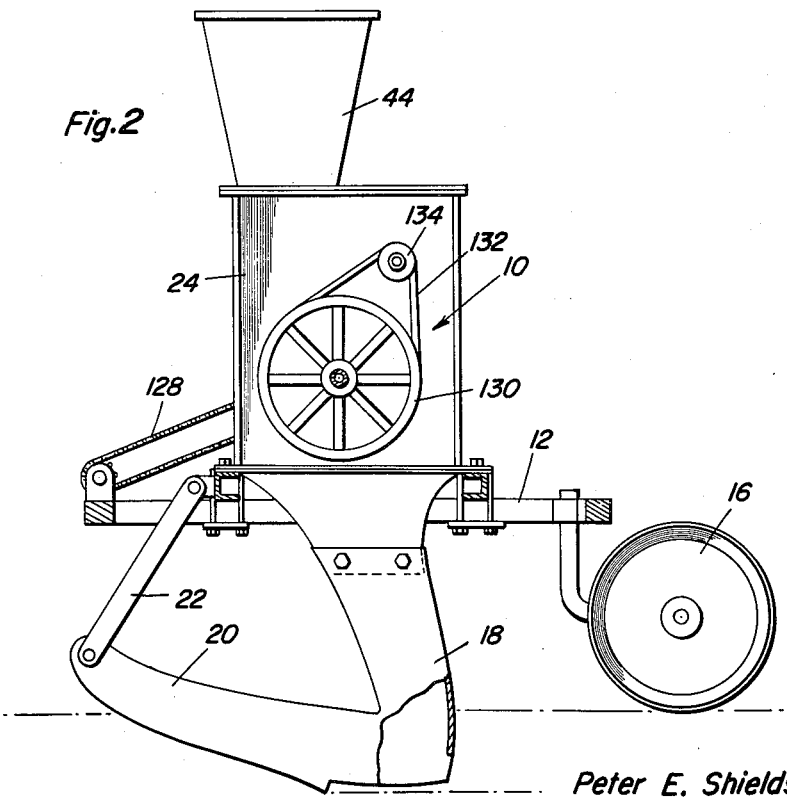
FIGURE 2 is a sectional view taken on the line 2—2 of FIGURE 1.

In the accompanying drawings there is shown a planter 10 constructed in accordance with the invention. The planter is mounted on a planter frame 12 which is conventional and adapted to be drawn by or mounted on a tractor. The planter 10 is located adjacent to planter 10a, and there is a shaft 14 coupling the two planters 10 and 10a so that they are operated in unison. Also, the planter or planters may be operated individually. The planter frame 12, being conventional, is equipped with a packer wheel 16 located behind the planter 10, together with seed chute 18 having a plow or row opener 20 at the front thereof supported by braces 22.

Reference is now made to the construction of the planter 10. It has a housing or casing 24 with two side walls 26 and 28 together with front and rear walls 30 and 32, a bottom wall 34 and top 40. Bottom wall 34 has an opening 36 that registers with the seed chute 18 so that the seeds which are distributed by distributor wheel 38 may be dropped directly into the seed chute 18. The top 40 of the housing has an opening 42 with which hopper 44 is communicated. The hopper is attached to the top wall 40 and is adapted to receive a supply of seed peanuts so that they may drop into chamber 46 enclosed by housing 24.

Distributor wheel 38 is of special construction. It is made of three juxtaposed disks or rings 50, 52 and 54 whose faces are engaged with each other and held immovable by dowel pins 56 that enter aligned openings in the three rings 50, 52 and 54. Stay bolts 58 are located in aligned apertures in the end plates 60 and 62 of distributor wheel 38 and these hold the rings 50, 52 and 54 of the distributor wheel assembled. In order to assure that rings will seat properly in the end plates 60 and 62, there are circumferential shoulders 64 and 66 on the inside surfaces of each of the end plates 60 and 62 to seat the outside rings 50 and 64. Hubs 70 and 72 are made on end plates 60 and 62 and these are attached to shaft 74 that extends through aligned openings and bearings 76 and 78 in the side walls 28 and 26 of housing 24.

The two outside rings 50 and 54 of distributor wheel 38 have circumferentially spaced pockets 80 and 82 which are circumferentially staggered with respect to each other. The center disk 52 has circumferentially spaced pockets 84 which are also offset with respect to the pockets 80 and 82 so that there is a complete transverse staggering of pockets along the entire periphery of the cylindrical outer surface of distributor wheel 38. Each pocket is adapted to accommodate a single seed peanut. One of the important features of this invention is the fact that the distributor wheel can be taken down and have any or all of the rings removed and replaced by rings having pockets in different patterns and/or sizes.

A peanut seed lift wheel or drum 86 is mounted for rotation above and slightly rearward of the distributor wheel 38. The lift wheel 86 is made of a wheel body 88, for instance a cylindrical wooden block, or a light weight hollow metal drum either with or without internal reinforcing. A shaft 90 is passed through aligned openings and bearings 92 and 94 attached to the side walls 28 and 26 of housing 24. Shaft 90 is also passed through sleeves 96 at the center of the seed lift wheel 86, and these are attached to the shaft 90 so that the seed lift wheel will rotate in response to rotation of shaft 90. A soft, rather thick covering 100 is on the periphery of seed lift wheel 86. The covering may be made of sponge rubber or some other soft substance, and preferably has a plurality of regularly spaced transverse slits 102 in its outer surface.

Deflector plate 104 having an arcuate part to conform to the surface of lift wheel 86 is suspended on a transverse spindle 108 that is attached to the side walls 26 and 28 of housing 24. The deflector plate covers the part of the seed lift wheel that is in alignment with the seed peanut entrance opening 42 in order to deflect the peanuts into chamber 46. The bottom of the chamber 46 is constructed of a transverse angle support 110 attached to wall 30 of the housing and having a soft panel 112 rigidly attached to it. The panel extends transversely across the bottom of chamber 46 and has one edge in contact with the periphery of the seed peanut distributor wheel 38. A pocket closing panel 114 having a part which is curved to conform to the curvature of the surface of wheel 38, is mounted for pivotal movement on a transverse spindle 116 that extends between and is secured to the side walls 26 and 28 of housing 24. To achieve the pivotal mounting, there is a sleeve bearing 118 welded or otherwise secured to the panel 114 intermediate the ends of the panel. One comparatively large part 114 of the panel has the aforementioned curvature, and the other part 120 of the panel has a counterweight 122 thereon of such weight that the part 114 of the panel presses gently against the surface of wheel 38. This is to hold the peanuts in the distributor wheel pockets until they are carried around sufficiently far to be free from the confining action of panel 114. Then they are gravity dropped into seed chute 18.

In operation, the chamber 46 is charged with peanuts. A drive for both wheels 38 and 86 is established by rotating shaft 74, for instance, by removable sprocket 126 which is driven by chain 128 and which, in turn, is ultimately driven from the tractor power take-off or from a sprocket on the tractor axle when used directly on the tractor. The sprocket 126 is removable so that it may be replaced by a larger or smaller sprocket in order to alter the speed of operation of the planter. A large pulley 130 is attached to shaft 74, and it has a belt 132 entrained thereover. This belt is also entrained over a smaller pulley 134 attached to shaft 90. Accordingly, the distributor wheel 38 and the seed peanut lift wheel 86 rotate in opposite directions and at different speeds at the adjacent peripheral surfaces thereof. Shaft 14 is a continuation of shaft 76 such as could be established by having the shaft 76 made long enough to enter and become a part of planters 10 and 10a and others like it. As an alternative, the shaft 14 may be merely a section attached to shaft 76 by means of a conventional coupling. In either case all of the planters will operate in unison and in the same way.

As the distributor wheel rotates, for instance in a clockwise direction as viewed in FIGURE 3, the seed pockets become filled with peanuts which are carried around past panel 114 and dropped into the seed chute 18. The size of the pockets in the distributor wheel is preselected as described previously in order to accommodate seed peanuts of a particular size and grade. When seed lift wheel 86 rotates, the seeds over and above those required to fill the pockets in wheel 38, are gently lifted and held in suspension by contacting the surface of lift wheel 86 having the described transverse slits 102 in its soft, spongy covering. Note in FIGURE 3 that the surfaces of the wheels do not contact. Instead, they are very slightly spaced from each other in order to achieve the sweeping action aided by air currents between the drums or wheels 38 and 86. The action of wheel 86 lifts all peanuts from distributor wheel 38 except those that are located in the distributor wheel pockets, allowing only those peanuts in the pockets to pass. Due to the diameters of the pulleys, the process is done very slowly and gently so as not to skin or bruise or crack the seed peanuts, inasmuch as this would prevent germination and defeat the purpose of this high speed planter. The distinction is made herein between handling the peanuts slowly as possible but yet having the planter move rapidly through the field. With a plurality of pockets in distributor wheel 38, the way they are staggered to have a large number of pockets in a small area, and the slow turning required of seed lift wheel 86, this is achieved.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A high speed planter for seed peanuts, said high speed planter comprising a housing having a plurality of walls, a seed chute connected with said housing at the lower end thereof, said housing having a seed chamber therein, a seed distributor wheel mounted for rotation in said housing at the bottom of said chamber and in registry with said seed chute, said wheel having a plurality of staggered pockets in the surface thereof, a seed lift wheel mounted for rotation above said distributor wheel and having a soft covering thereon, said covering having an outer surface spaced slightly from the surface of said distributor wheel and adapted to rotate in the direction with respect to rotation of the distributor wheel such that the adjacent parts of the wheels are moving in opposite directions to thereby gently lift all peanuts from the surface of the distributor wheel except those in the pockets thereof, a panel pivotally mounted in said housing and contacting a substantial portion of the surface of said distributor wheel below the axis of rotation of said distributor wheel to retain the seeds in the pockets and hold them confined until the wheel moves sufficiently far in its rotation so that the pockets containing the peanut seeds become removed from said panel and the peanut seeds are dropped by gravity into said seed chute, a counterweight connected to said panel for urging the same toward the distributor wheel by effect of gravity on said counterweight, said chamber having bottom forming means adjacent to said distributor wheel and including a resilient strip having an edge in contact with the periphery of said distributor wheel and on the side of the distributor wheel opposite to that side occupied by said panel, said seed lift wheel covering having a plurality of transverse slits therein by which to aid in lifting the peanut seeds from the surface of said distributor wheel in order to assure that each pocket in the distributor wheel contains only one peanut seed.

References Cited in the file of this patent

UNITED STATES PATENTS

| 789,724 | Goffe | May 16, 1905 |
| 1,330,179 | Edtbauer | Feb. 10, 1920 |
| 2,510,658 | Rassmann | June 6, 1950 |
| 2,593,516 | Alley et al. | Apr. 22, 1952 |
| 2,732,975 | Balzer | Jan. 31, 1956 |
| 2,801,729 | Hejtmanek | Aug. 6, 1957 |

FOREIGN PATENTS

| 2,094 | Great Britain | of 1887 |
| 795,062 | Great Britain | May 14, 1958 |
| 363,342 | Italy | Oct. 3, 1938 |
| 493,094 | Belgium | Jan. 31, 1950 |
| 1,030,352 | France | Mar. 11, 1953 |
| 1,108,912 | France | Sept. 14, 1955 |
| 1,112,183 | France | Nov. 9, 1955 |